United States Patent
Cave et al.

(10) Patent No.: US 8,369,228 B2
(45) Date of Patent: Feb. 5, 2013

(54) METHOD FOR DETECTING RADIO LINK FAILURE FOR TRANSMISSION OVER ENHANCED DEDICATED CHANNEL IN A CELL_FACH STATE

(75) Inventors: Christopher R. Cave, Montreal (CA); In H. Kim, Norristown, PA (US); Benoit Pelletier, Roxboro (CA); Paul Marinier, Brossard (CA); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 910 days.

(21) Appl. No.: 12/259,691

(22) Filed: Oct. 28, 2008

(65) Prior Publication Data
US 2010/0041389 A1 Feb. 18, 2010

Related U.S. Application Data

(60) Provisional application No. 60/983,406, filed on Oct. 29, 2007, provisional application No. 61/047,909, filed on Apr. 25, 2008.

(51) Int. Cl.
*H04L 12/26* (2006.01)
*H04B 7/005* (2006.01)
*H04W 72/00* (2009.01)

(52) U.S. Cl. ........ 370/244; 370/248; 370/252; 370/278; 455/452.2

(58) Field of Classification Search ................. None
See application file for complete search history.

(56) References Cited

U.S. PATENT DOCUMENTS

| | | | |
|---|---|---|---|
| 7,321,780 B2* | 1/2008 | Love et al. | 455/522 |
| 7,584,397 B2* | 9/2009 | Terry | 714/748 |
| 7,701,844 B2* | 4/2010 | Terry | 370/216 |
| 7,864,724 B2* | 1/2011 | Kaikkonen et al. | 370/318 |
| 8,031,738 B2* | 10/2011 | Kuo | 370/439 |
| 2008/0026741 A1* | 1/2008 | Nakamata et al. | 455/420 |
| 2008/0130488 A1* | 6/2008 | Kuo | 370/216 |
| 2008/0182594 A1* | 7/2008 | Flore et al. | 455/458 |
| 2009/0109912 A1* | 4/2009 | DiGirolamo et al. | 370/329 |
| 2009/0163199 A1* | 6/2009 | Kazmi et al. | 455/425 |
| 2009/0196230 A1* | 8/2009 | Kim et al. | 370/328 |
| 2009/0323592 A1* | 12/2009 | Terry | 370/328 |
| 2010/0195507 A1* | 8/2010 | Marinier et al. | 370/242 |

FOREIGN PATENT DOCUMENTS

| | | |
|---|---|---|
| KR | 10-2003-0066850 A | 8/2003 |
| RU | 2285337 C2 | 10/2006 |
| WO | WO 2006/000876 A1 | 1/2006 |
| WO | WO 2006/014092 A1 | 2/2006 |
| WO | WO 2007/024791 A2 | 3/2007 |

OTHER PUBLICATIONS

Ericsson, "Faster L1 DCH synchronization," 3GPP TSG RAN WG2 Meeting #46, R2-050446, (Feb. 14-18, 2005).

(Continued)

*Primary Examiner* — Gregory Sefcheck
(74) *Attorney, Agent, or Firm* — Condo Roccia LLP

(57) ABSTRACT

A method and apparatus are used for detecting a radio link (RL) failure and a post verification process. A quality of a downlink fractional dedicated physical channel (F-DPCH) is monitored once a transmission on an enhanced dedicated channel (E-DCH) has begun. It is determined whether the quality of the downlink F-DPCH is below a predefined threshold. If the quality is below the predefined threshold, then an occurrence of an RL failure is declared and a transmission over the E-DCH in a cell forward access channel (CELL_FACH) state is terminated. In a case of the post verification failure, E-DCH resources are released.

19 Claims, 9 Drawing Sheets

OTHER PUBLICATIONS

Huawei, "RLF in Enhanced Cell_FACH," 3GPP TSG-RAN WG2 Meeting #62, R2-082287 (May 5-9, 2008).

Nokia Siemens Networks et al., "Enhanced Uplink For CELL_FACH State in FDD", TSG-RAN #37 Meeting, RP-070677, (Riga, Lativa, Sep. 11-14, 2007).

Third Generation Partnership Project, "Technical Specification Group Access Network; Physical Layer Procedures (FDD) (Release 7)", 3GPP TS 25.214, V7.6.0, (Sep. 2007).

Third Generation Partnership Project, "Technical Specification Group Access Network; Physical Layer Procedures (FDD) (Release 7)", 3GPP TS 25.214, V7.9.0, (May 2008).

Third Generation Partnership Project, "Technical Specification Group Access Network; Physical Layer Procedures (FDD) (Release 7)", 3GPP TS 25.214, V8.1.0, (Mar. 2008).

Third Generation Partnership Project, "Technical Specification Group Access Network; Physical Layer Procedures (FDD) (Release 7)", 3GPP TS 25.214, V8.3.0, (Sep. 2008).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 4)," 3GPP TS 25.331 V4.19.0 (Jun. 2005).

Third Generation Partnership Project, "Technical Specification Group Radio Access Network; Radio Resource Control (RRC); Protocol Specification (Release 5)," 3GPP TS 25.331 V5.19.0 (Dec. 2006).

Third Generation Partnership Project, "Technical Specification Group Radio Access Network; Radio Resource Control (RRC); Protocol Specification (Release 5)," 3GPP TS 25.331 V5.22.1 (Aug. 2008).

Third Generation Partnership Project, "Technical Specification Group Radio Access Network; Radio Resource Control (RRC); Protocol Specification (Release 6)," 3GPP TS 25.331 V6.15.0 (Sep. 2007).

Third Generation Partnership Project, "Technical Specification Group Radio Access Network; Radio Resource Control (RRC); Protocol Specification (Release 6)," 3GPP TS 25.331 V6.19.0 (Sep. 2008).

Third Generation Partnership Project, "Technical Specification Group Radio Access Network; Radio Resource Control (RRC); Protocol Specification (Release 7)," 3GPP TS 25.331 V7.6.0 (Sep. 2007).

Third Generation Partnership Project, "Technical Specification Group Radio Access Network; Radio Resource Control (RRC); Protocol Specification (Release 7)," 3GPP TS 25.331 V7.10.0 (Sep. 2008).

Third Generation Partnership Project, "Technical Specification Group Radio Access Network; Radio Resource Control (RRC); Protocol Specification (Release 8)," 3GPP TS 25.331 V8.0.0 (Sep. 2007).

Third Generation Partnership Project, "Technical Specification Group Radio Access Network; Radio Resource Control (RRC); Protocol Specification (Release 8)," 3GPP TS 25.331 V8.4.0 (Sep. 2008).

Nokia Siemens Networks et al., "Enhanced Uplink For CELL_FACH State in FDD", TSG-RAN #37 Meeting, RP-070677, (Riga, Latvia, Sep. 11-14, 2007).

Third Generation Partnership Project, "Technical Specification Group Access Network; Physical Layer Procedures (FDD) (Release 7)", 3GPP TS 25.214 V7.6.0, (Sep. 2007).

Third Generation Partnership Project, "Technical Specification Group Access Network; Physical Layer Procedures (FDD) (Release 7)", 3GPP TS 25.214 V7.9.0, (May 2008).

Third Generation Partnership Project, "Technical Specification Group Access Network; Physical Layer Procedures (FDD) (Release 7)", 3GPP TS 25.214 V8.1.0, (Mar. 2008).

Third Generation Partnership Project, "Technical Specification Group Access Network; Physical Layer Procedures (FDD) (Release 7)", 3GPP TS 25.214 V8.3.0, (Sep. 2008).

3rd Generation Partnership Project (3GPP), R4-050507, "Radio link failure criteria on F-DPCH", Nokia, 3GPP TSG-RAN WG4 Meeting #35, Athens, Greece, May 9-13, 2005, 2 pages.

* cited by examiner

METHOD FOR DETECTING RADIO LINK FAILURE FOR TRANSMISSION OVER ENHANCED DEDICATED CHANNEL IN A CELL_FACH STATE

CROSS REFERENCE TO RELATED APPLICATIONS

This application claims the benefit of U.S. provisional application No. 60/983,406 filed on Oct. 29, 2007, and 61/047,909 filed on Apr. 25, 2008 which is incorporated by reference as if fully set forth.

FIELD OF INVENTION

This application is related to wireless communications.

BACKGROUND

As part of ongoing evolution of the Wideband Code Division Multiple Access (WCDMA) standard in Release 8 of the Third Generation Partnership Project (3GPP) standard, a new work item was established to incorporate an enhanced dedicated channel (E-DCH) for wireless transmit receive units (WTRUs) in a CELL_FACH state.

FIG. 1 shows radio resource control (RRC) service states of a 3GPP WTRU with an enhanced uplink (UL). The WTRU may operate in several states depending on the user activity. The following states have been defined: IDLE, cell dedicated channel (CELL_DCH), cell forward access channel (CELL_FACH), universal mobile telecommunications system (UMTS) terrestrial radio access network (UTRAN) registration area paging channel (URA_PCH), and cell paging channel (CELL_PCH). RRC state transitions are controlled by the network using radio network controller (RNC) parameters, in general the WTRU does not decide to perform state changes by itself.

In the CELL_DCH state, a dedicated physical channel is allocated to the WTRU in the UL and the downlink (DL). The WTRU is known on a cell level according to its current active set. The WTRU may use dedicated transport channels, shared transport channels, or a combination of these transport channels.

A WTRU is in the CELL_FACH state if it has been assigned to use the common channels (e.g., forward access channel (FACH), random access channel (RACH)). In the CELL_FACH state, no dedicated physical channel is allocated to the WTRU, and the WTRU continuously monitors a forward access channel (FACH) (e.g., carried over the secondary common control physical channel (S-CCPCH)) or a high speed downlink shared channel (HS-DSCH) in the DL. The WTRU is assigned a default common or shared transport channel in the UL (e.g., random access channel (RACH)) that it may use anytime according to the access procedure for that transport channel. The position of the WTRU is known by the UTRAN on a cell level according to the cell where the WTRU last performed a cell update.

In the CELL_PCH state, no dedicated physical channel is allocated to the WTRU. The WTRU selects a PCH, and uses discontinuous reception for monitoring the selected PCH via an associated page indicator channel (PICH). No UL activity is possible. The position of the WTRU is known by the UTRAN on a cell level according to the cell where the WTRU last performed a cell update in the CELL_FACH state.

In the URA_PCH state, no dedicated channel is allocated to the WTRU. The WTRU selects a PCH, and uses discontinuous reception for monitoring the selected PCH via an associated PICH. No UL activity is possible. The location of the WTRU is known on a UTRAN registration area level according to the URA assigned to the WTRU during the last URA update in the CELL_FACH state.

The RACH transport mechanism is based on a slotted-Aloha approach with an acquisition indication. Before transmitting a message, a WTRU acquires the channel by transmitting a short preamble that is made up of a randomly selected signature sequence in a randomly selected access slot. The WTRU then listens and waits for an acquisition indication from a Node-B on the acquisition indication channel (AICH). The indication includes a specific AICH signature sequence mapped one-to-one to the preamble signature sequence chosen by the WTRU. If a positive acquisition indication is received, the WTRU has effectively acquired the channel, and may transmit its message. The resources that the WTRU may use in the RACH systems are predetermined by the choice of the preamble signature sequence.

The E-DCH may be used to increase the data rate for CELL_FACH WTRUs in a new enhanced RACH (E-RACH). The WTRU may transmit via the E-DCH for a longer duration than is possible using the Release 99 RACH (i.e., 10 ms or 20 ms durations).

Transmission over E-DCH requires dedicated radio control channels to be established. In pre-Release 8 systems, when moving from the CELL_FACH state to the CELL_DCH state, a synchronization procedure is executed whereby the transmit power of the Node-B and the WTRU are set to the appropriate level. This synchronization procedure A, defined in the 3GPP standards, is designed to accommodate long connection time. The procedure consists of two phases. During the first phase, only in-sync primitives may be reported from the physical layer to the Layer 3 (L3) of the WTRU. An in-sync primitive is reported if the quality of the DL radio link (RL) (i.e., fractional dedicated physical channel (F-DPCH) or dedicated physical control channel (DPCCH)) during the previous 40 ms is above a predefined threshold. Primitives are reported every 10 ms frames. The physical channel is considered established when N312 consecutive in-sync are reported in a duration period of T312, where both N312 and T312 may be configured by the UTRAN. When the physical channel is established, the WTRU may start an UL transmission. Phase 2 begins 160 ms after the physical channel is established, at which point both in-sync and out-of-sync primitives may be reported to the L3 of the WTRU.

In the case of an E-DCH transmission in the CELL_FACH state, another synchronization procedure (e.g., synchronization procedure AA) which makes use of the post-verification period is provided. The post-verification period is a 40 ms time period wherein the DL signal quality is confirmed. During the post-verification procedure, the WTRU may transmit data on the UL immediately. While transmitting, the WTRU monitors the quality of the transmission power control (TPC) field of the F-DPCH. If after the first 40 ms the quality of the TPC field of the F-DPCH is better than a threshold Qin, then the post-verification is successful, otherwise it has failed.

When the post-verification period fails for a WTRU in or moving to CELL_DCH state, the WTRU's behavior of the synchronization procedure is defined in the 3GPP standard. However, the WTRU's behavior is not defined for the proposed synchronization procedure for the WTRU when it is operating in the CELL_FACH state.

Current specifications for the RL establishment and power control are defined for dedicated RL resources that are reserved for long periods of time to a particular WTRU.

However, they are not well suited for situations where the WTRU occupies the channel for short periods of time, (e.g., for burst traffic), followed by a release of the radio resources.

In the current 3GPP standard, RL failure is only triggered when the WTRU is in the CELL_DCH state. The WTRU's behavior after the RL failure includes transitioning to the CELL_FACH state, performing cell reselection and initiating a cell update procedure. However, procedures are desired for triggering an RL failure for a WTRU that is in the CELL_ACH state.

SUMMARY

A method and apparatus are used for detecting an RL failure and a post verification process. A quality of a downlink F-DPCH is monitored once a transmission on an E-DCH has begun. It is determined whether the quality of the downlink F-DPCH is below a predefined threshold. If the quality is below the predefined threshold, then an occurrence of an RL failure is indicated and a transmission over the E-DCH in the CELL_FACH state is terminated. In a case of the post verification failure, E-DCH resources are released.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

When referred to hereafter, the term E-DCH may be used to indicate transmission over the E-DCH following a contention based access in the CELL_FACH state, the CELL_PCH state, the URA_PCH state, or IDLE mode. The term E-DCH in CELL_FACH state may indicate E-DCH in CELL_PCH state, URA_PCH state, and/or IDLE mode. The methods disclosed herein are also applicable to any other improvement to the existing contention based access (i.e., RACH) where the WTRU occupies the channel for longer durations.

Figure 1:
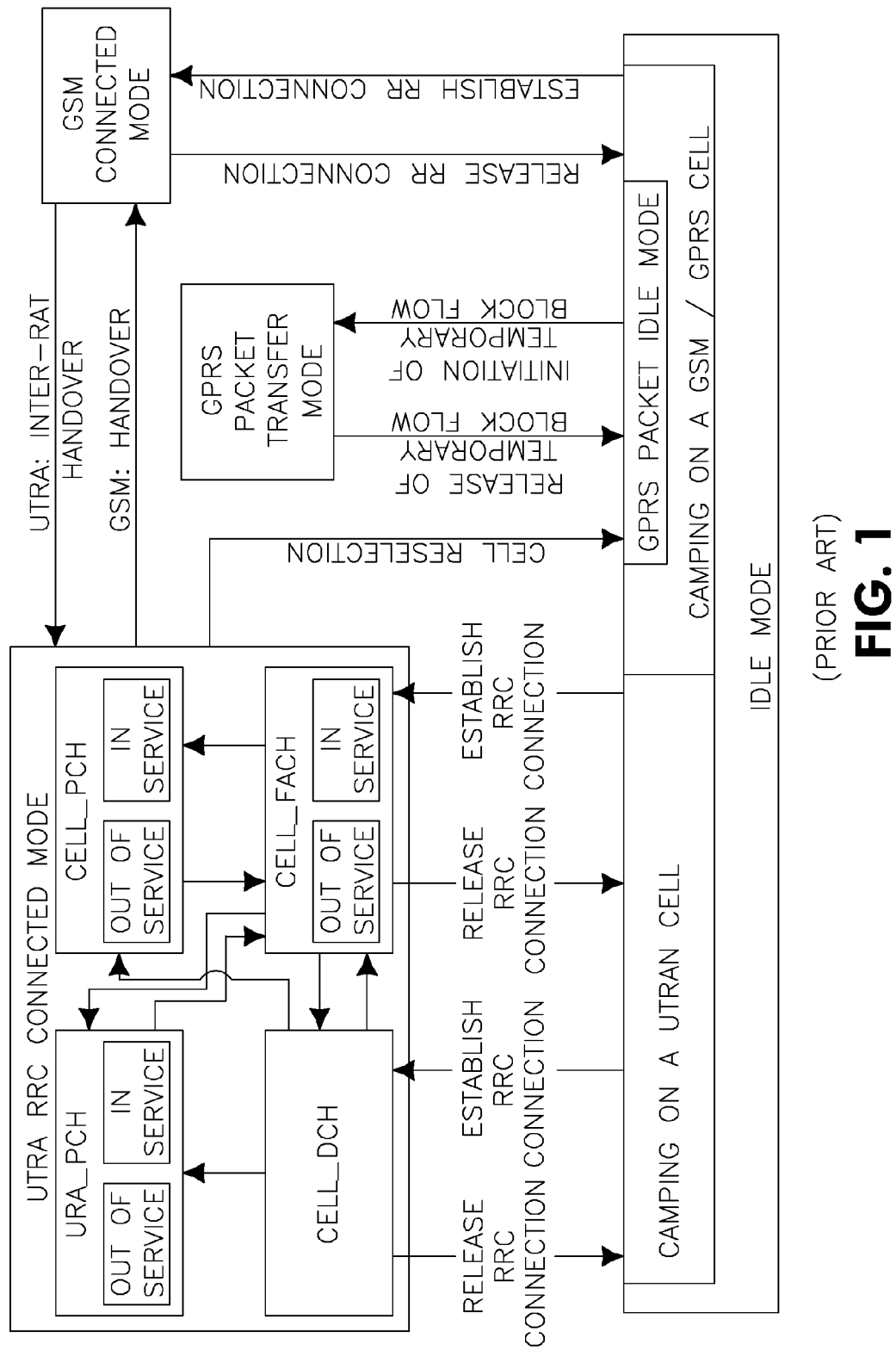
FIG. 1 shows the RRC states with high speed downlink packet access (HSDPA)/high speed uplink packet access (HSUPA)
Figure 2:
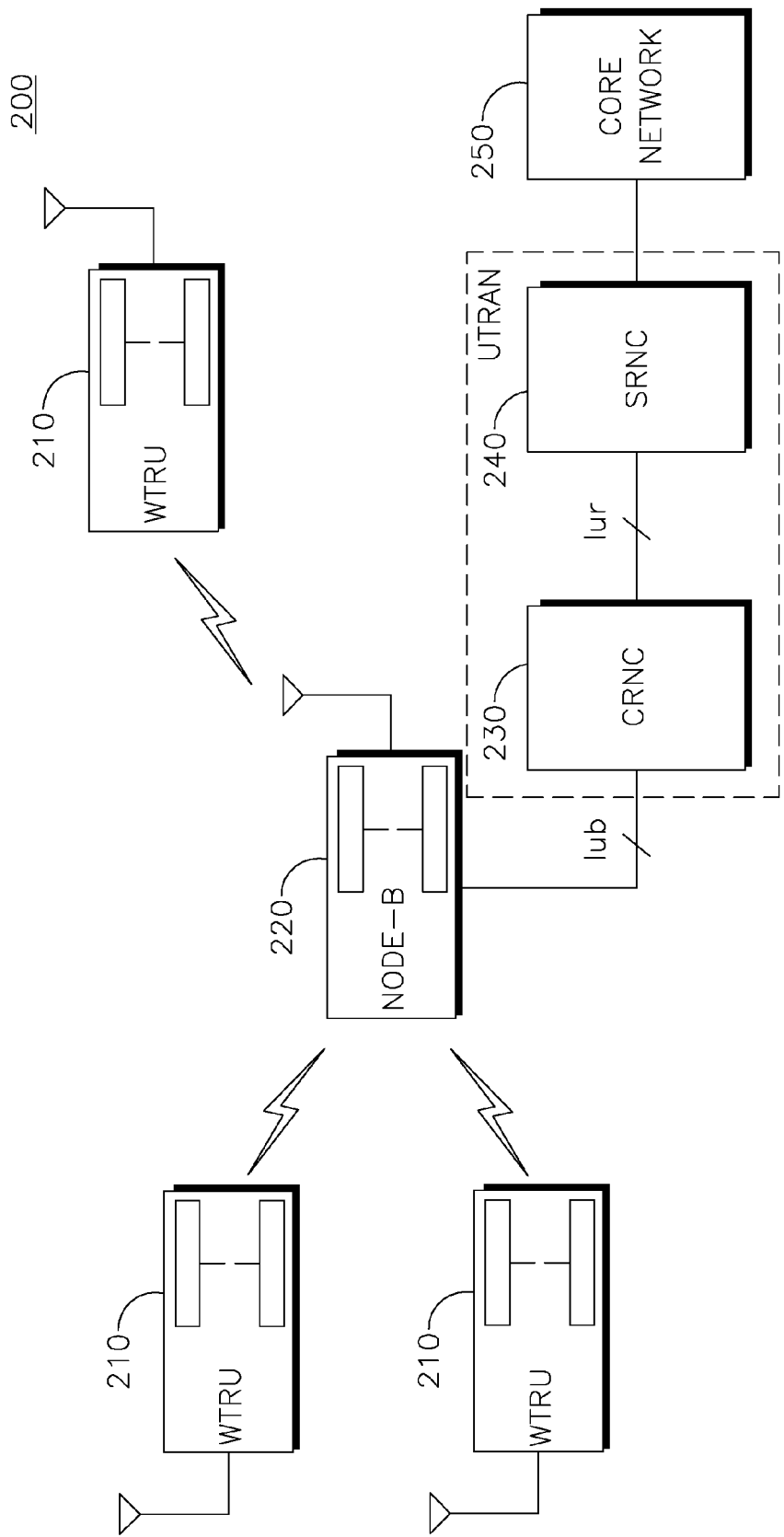
FIG. 2 shows a wireless communication system.
Figure 3:
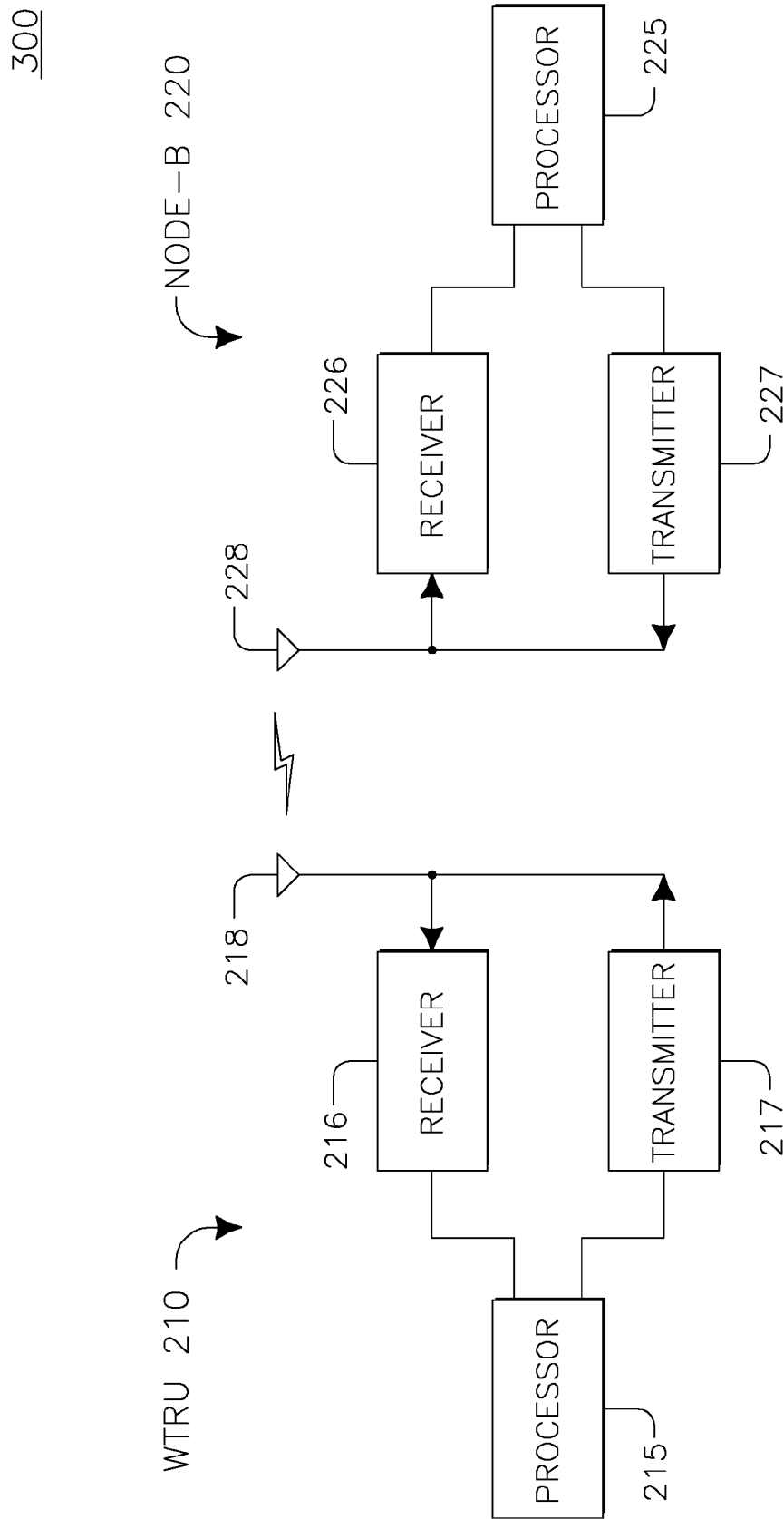
FIG. 3 is a functional block diagram of a WTRU and the base station of the wireless communication system shown in FIG. 2.

FIG. 2 shows a wireless communication system 200 including a plurality of WTRUs 210, a Node-B 220, a CRNC 230, an SRNC 240, and a core network 250. As shown in FIG. 3, the WTRUs 210 are in communication with the Node-B 220, which is in communication with the CRNC 230 and the SRNC 240. Although three WTRUs 210, one Node-B 220, one CRNC 230, and one SRNC 240 are shown in FIG. 2, it should be noted that any combination of wireless and wired devices may be included in the wireless communication system 200.

FIG. 3 is a functional block diagram 300 of a WTRU 210 and the Node-B 220 of the wireless communication system 200 of FIG. 2. As shown in FIG. 3, the WTRU 210 is in communication with the Node-B 220 and both are configured to perform a method for detecting the occurrence of an RL failure when a WTRU transmits over the E-DCH in the CELL_FACH state.

In addition to the components that may be found in a typical WTRU, the WTRU 210 includes a processor 215, a receiver 216, a transmitter 217, and an antenna 218. The processor 215 is configured to perform a method for detecting the occurrence of an RL failure when a WTRU transmits over the E-DCH in the CELL_FACH state. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical base station, the Node-B 220 includes a processor 225, a receiver 226, a transmitter 227, and an antenna 228. The processor 225 is configured to perform a method for detecting the occurrence of an RL failure when a WTRU transmits over the E-DCH in the CELL_FACH state. The receiver 226 and the transmitter 227 are in communication with the processor 225. The antenna 228 is in communication with both the receiver 226 and the transmitter 227 to facilitate the transmission and reception of wireless data.

Figure 4:
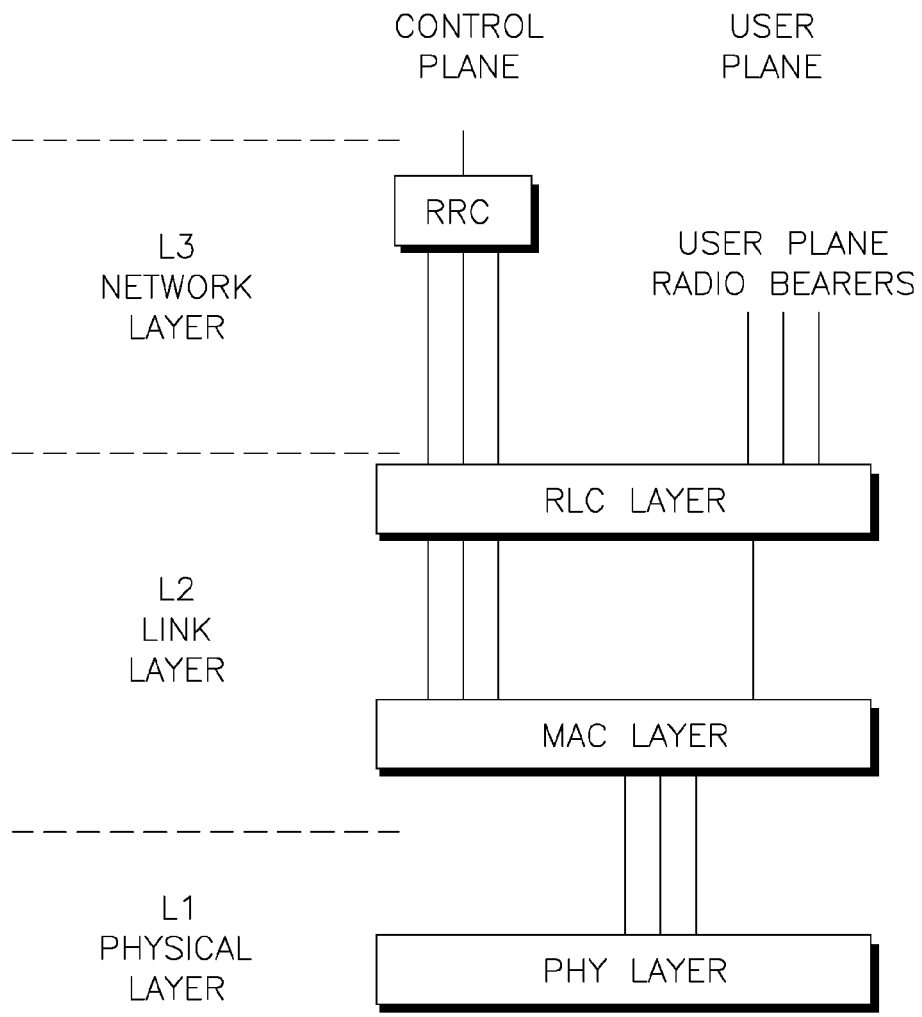
FIG. 4 shows an example block diagram of a radio interface protocol model.

FIG. 4 illustrates radio interface protocol model 400. The WTRU 210 may include an RRC layer (L3) entity, an RLC entity, a medium access control (MAC) entity and a physical (PHY) layer (L1) entity. The RLC entity includes a transmitting side subassembly and a receiving side subassembly. The transmitting side subassembly includes a transmission buffer. The RLC entity increases reliability of the radio transmission. The MAC entity controls user access to the transmission medium. The PHY layer transmits and receives data over the air. The Node-B 220 may include the same entities as shown in the FIG. 4.

Figure 5:
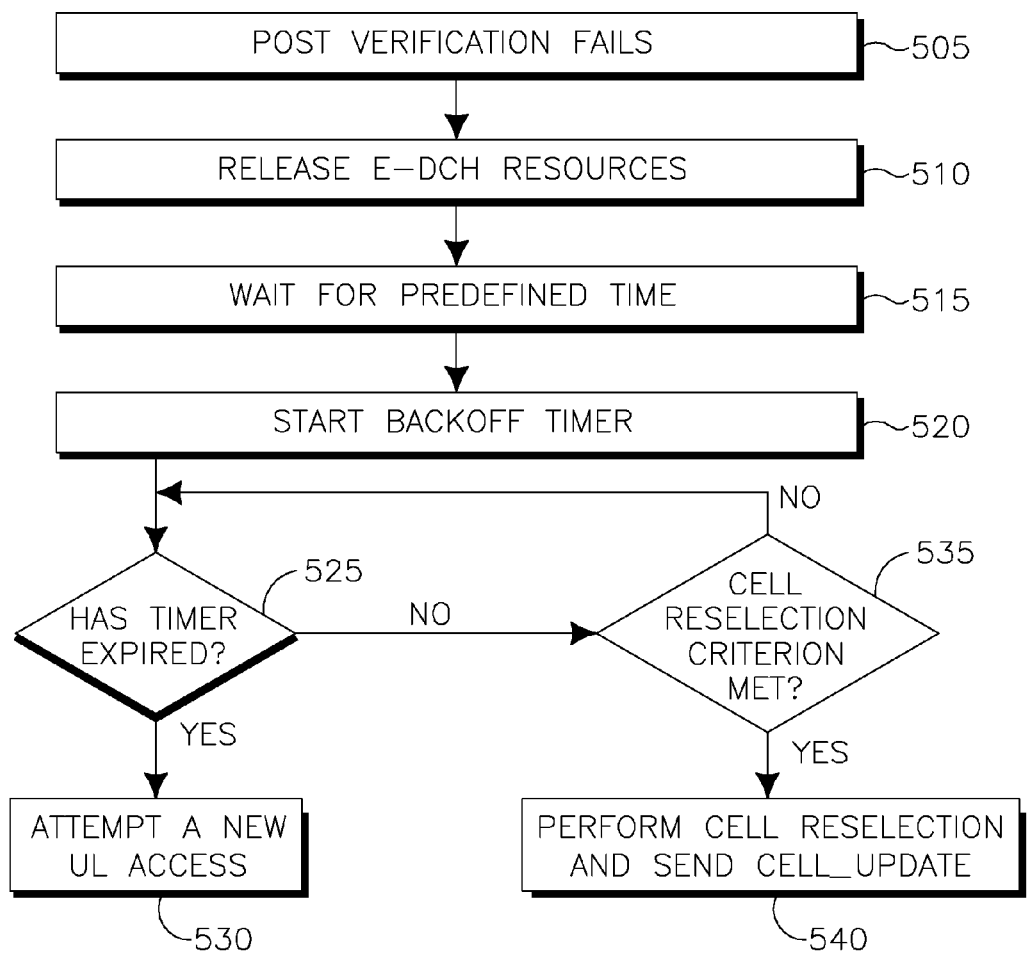
FIG. 5 shows a flow diagram of the WTRU's behavior if the post-verification process has failed.

FIG. 5 shows a flow diagram of the WTRU's 210 behavior when the post verification process has failed. The post verification process fails 505. The WTRU 210 may be configured to trigger a release of E-DCH resources 510. Optionally, the WTRU 210 may be configured to wait for a predefined timer to expire 515. The WTRU 210 may be configured to perform a backoff procedure prior to attempting another E-DCH UL random access. The WTRU 210 may be configured to start a backoff timer 520. If the timer has not expired 525, the WTRU 210 may be configured to verify if the cell reselection criterion is met 535. If the cell reselection criterion is met, the WTRU 210 may be configured to perform the cell update procedure and transmits a CELL UPDATE message to the Node-B 540. If the cell reselection criterion is not met, the WTRU 210 continues verifying the backoff timer status and cell update criterion. When the backoff timer has expired 525, the WTRU 210 may be configured to attempt a new UL random access 530. The backoff timer may be configured by the higher layers.

Alternatively, the WTRU 210 may perform the cell update procedure indicating a cell reselection, an RL failure, or a new action indicating a failure during the E-DCH in the CELL_FACH state. Optionally, the WTRU 210 may be configured to indicate transmission failure to higher layers.

Releasing the E-DCH resources or terminating the E-DCH access in the CELL_FACH state or idle mode may comprise of the following. The PHY layer may report to the MAC that the PHY layer procedure has failed and ended, at which point the MAC layer stops transmitting the data to the physical layer. The E-DCH reception (E-DCH Access Grant Channel (E-AGCH), E-DCH Hybrid Automatic Repeat Request (HARQ) Indicator Channel (E-HICH), E-DCH Relative Grant Channel (E-RGCH)) and the transmission (E-DPCCH, E-DCH Dedicated Physical Data Channel (E-DPDCH)) procedures are stopped. The MAC-i/is entity is reset. Resetting the MAC-i/is entity includes flushing HARQ processes, setting transmission sequence number (TSN) to initial value and discarding any remaining segments in the segmentation buffer. Alternatively, the WTRU 210 may flush the HARQ processes only or flushes the HARQ processes and resets the TSN values instead of performing a full MAC-i/is reset. Optionally, the WTRU 210 may clear the E-DCH radio network temporary identity (E-RNTI), HS-DSCH RNTI (H-RNTI), or cell RNTI (C-RNTI).

Figure 6:
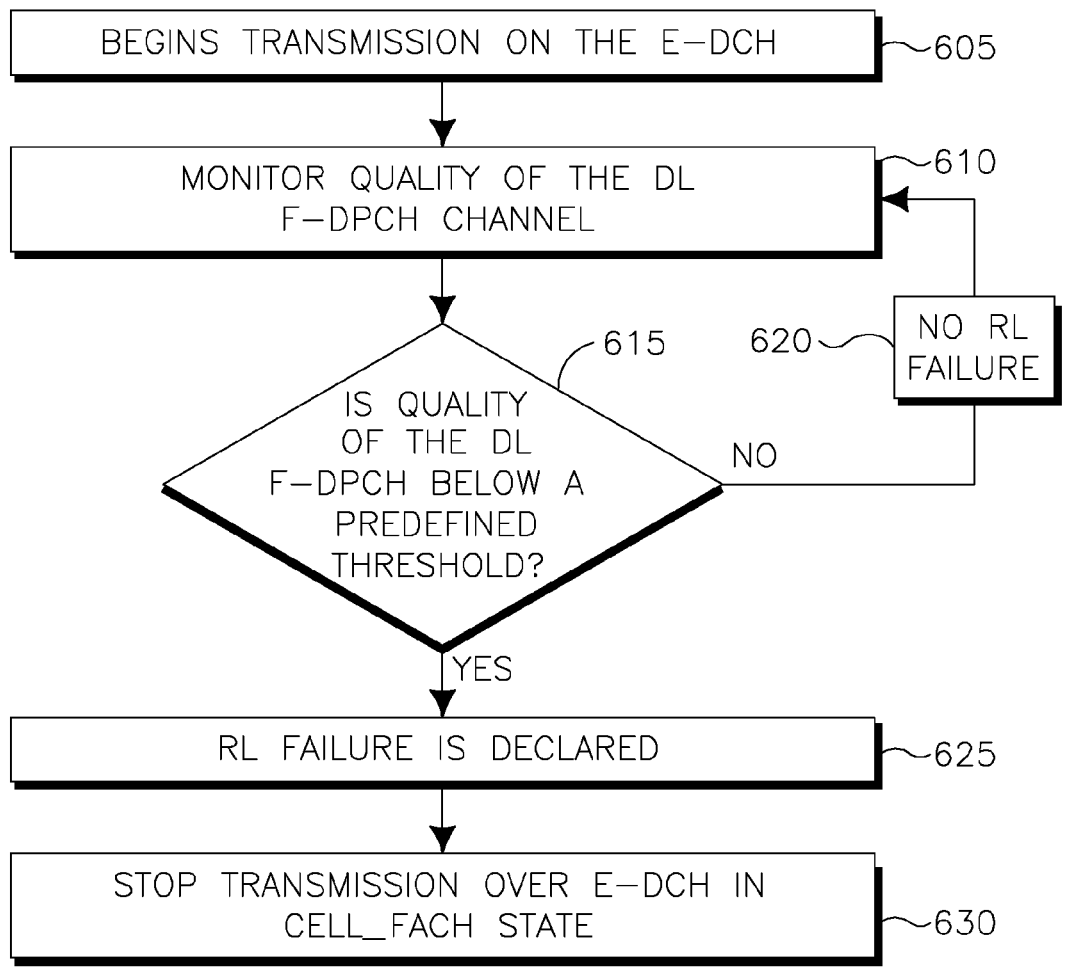
FIG. 6 shows a flow diagram of the triggering condition of RL failure when the WTRU transmits over the E-DCH in the CELL_FACH state.

FIG. 6 shows a flow diagram of a triggering condition of an RL failure for a WTRU 210 in the CELL_FACH state. The WTRU 210 starts transmission via the E-DCH 605. The quality of the associated DL F-DPCH is monitored 610. The channel quality may be monitored at a specific offset from the time the WTRU 210 starts transmission. If the quality of the F-DPCH is below a predefined threshold (i.e., $Q_{F\text{-}DPCH}$) 615 for N frames, it is determined that the RL failure has occurred 625, where N is a predefined number of consecutive frames. If the quality of the F-DPCH is not below the predefined threshold, then there is no RL failure 620 and the monitoring of the quality of the DL F-DPCH channel continues 610. If the quality of the F-DPCH is not met for N frames then the L1 reports to the L3 declaring the RL failure 625. Upon radio link failure the WTRU 210 may be configured to terminate any E-DCH transmissions in the CELL_FACH state 630.

Figure 7:
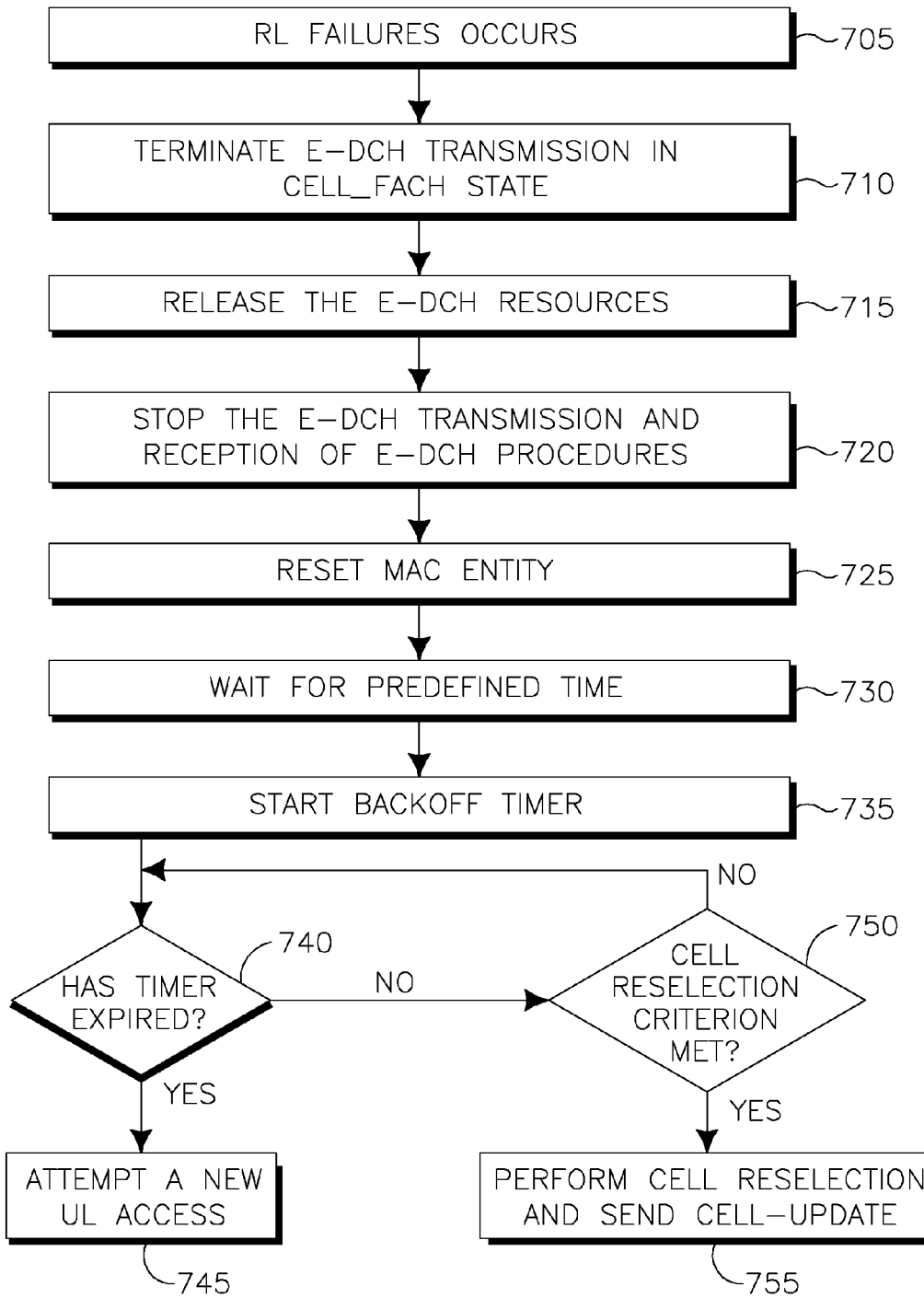
FIG. 7 shows a diagram for behavior of a WTRU when an RL failure has been detected.

FIG. 7 shows a diagram for behaviors of the WTRU 210 when an RL failure has been detected. An RL failure occurs 705. The WTRU 210 may terminate the E-DCH transmission in the CELL_FACH state 710. The termination of the E-DCH transmission comprises of releasing the E-DCH resources 715. The E-DCH transmission and reception procedure is stopped 720. The MAC-i/is entity is reset 725. The WTRU 210 may be configured to wait for a predefined time 730. The WTRU 210 may be configured to start a backoff timer 735. The WTRU 210 may be configured to determine whether the timer has expired 740. If the timer has not expired, the WTRU 210 is configured to verify if the cell reselection criterion is met 750. If the cell reselection criterion is met, the WTRU 210 may be configured to perform the cell reselection procedure and send the CELL UPDATE message to the Node-B 755. If the cell reselection is not met, the WTRU 210 is configured to continue verifying the status of the backoff timer. If the timer has expired, then the WTRU 210 is configured to attempt a new UL random access 745.

Alternatively, when the RL failure has occurred, the WTRU 210 may flush the HARQ processes; reset the TSN; and perform the cell update procedure with an action indicating cell reselection, RL failure, or any action indicating a failure during the E-DCH in the CELL_FACH state.

Alternatively, the WTRU 210 may reattempt the transmission via the E-DCH up to predefined K times, and then trigger a cell reselection procedure.

Alternatively, if the WTRU 210 had attempted the transmission using a shortened transmission time interval (TTI) value (e.g., 2 ms), the WTRU 210 may reattempt transmission via the E-DCH using a larger TTI value (e.g., 10 ms).

Alternatively, if the WTRU 210 had attempted the transmission via the E-DCH using a large TTI value (e.g., 10 ms), the WTRU 210 may attempt transmission over the RACH.

Alternatively, the quality of the associated DL DPCCH may be monitored. If the quality of the DPCCH is below a predefined threshold for N frames, it is determined that an RL failure has occurred, where N is a predefined number of consecutive frames.

The L1 may also be configured to report to the L3 declaring the RL failure, if the quality of the F-DPCH or the DPCCH is below a predefined threshold, $Q_{F\text{-}DPCH}$, for the N out of M consecutive frames.

Alternatively, the WTRU 210 may be configured to monitor the quality of a common pilot channel (CPICH). If the quality of the CPICH or any other DL control channel is below a predefined threshold for the N frames, the WTRU's 210 L1 reports RL failure to the L3 of the WTRU 210.

Alternatively, the WTRU 210 may be configured to monitor the reception of a positive acknowledgment (ACK) or a negative acknowledgment (NACK) from the Node-B 220 for its UL transmissions. If the WTRU 210 receives K NACKs within a window of predefined successive UL transmission L, wherein K and L are preconfigured or signaled to the WTRU 210, the L1 at the WTRU 210 reports to L3 at the WTRU 210 indicating that an RL failure has occurred.

Alternatively, the WTRU 210 may be configured to monitor success of hybrid automatic retransmit request (HARQ) processes. If R HARQ processes fail within a window of J new HARQ process, the WTRU 210 may be configured to declare an RL failure, where R and J are parameters that may be preconfigured or signaled to the WTRU 210.

The WTRU 210 maybe configured to receive S successive TPC up commands over the F-DPCH or the DPCCH, where S is preconfigured or signaled to the WTRU 210. If the WTRU 210 is unable to further increase its transmission power because the maximum power has been reached, the WTRU 210 may declare an RL failure.

Alternatively, RL failure may be declared when the WTRU 210 transmits the S successive TPC up commands over the UL DPCCH to request that the Node-B 220 increase its DL transmission power, without observing an increase in received power on the DL control channels.

In a limited UL transmission, the WTRU 210 may be configured to use the E-DCH to ping the Node-B 220 and the WTRU 210 verifies the Node-B 220 in either AICH or F-DPCH, then the WTRU 210 reports an RL failure. The ping transmission is setup so that the ping transmission occurs when there have been no UL transmission in over a period $T_{ping}$.

Alternatively, if the WTRU 210 does not receive signal from the Node-B 220 on designated slots over M period, then the WTRU 210 reports RL failure.

Figure 8:
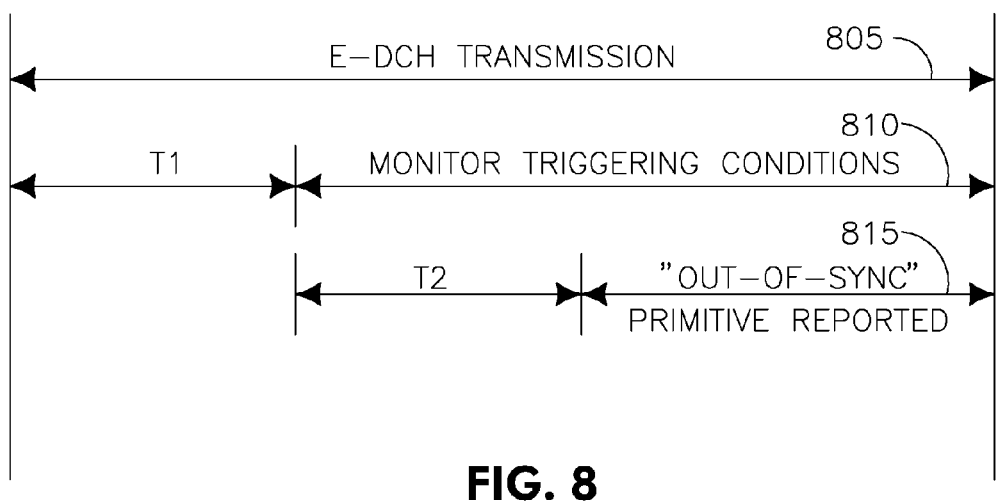
FIG. 8 shows a timing chart for monitoring of RL failure conditions.

FIG. 8 shows a timing chart for monitoring the RL failure conditions. As mentioned above in FIG. 6, and for all of the triggering conditions, the WTRU 210 may begin transmission over the E-DCH 805 (i.e., following an AICH indication from the Node-B 220). The WTRU 210 may begin monitoring the conditions at an offset, T1, from the time the WTRU 210 starts transmission 810. The time offset parameter period allows the power control loop to have sufficient time to converge. An additional grace period, T2, may be introduced from the time where the triggering conditions start being monitored to the time where the physical layer is allowed to report out-of-sync primitive 815. The additional grace period, T2, allows additional time for power control loop stabilization. The periods T1 and T2 are time offset parameters, which may be predefined or configured by higher layers (i.e., RRC signaling or the broadcast channel). Note, the T1 and T2 may also take value of zero, individually or jointly, as a special case of the more general scenario herein.

Alternatively, the WTRU 210 may be configured to monitor the RL quality while it is not transmitting via the E-DCH in the CELL_FACH state. Specifically, the WTRU 210 in the CELL_FACH state, the CELL_PCH state, or the URA_PCH state may continuously monitor the quality of any other DL control channel (e.g., CPICH). If the quality of an observed DL control channel falls below a predefined threshold for a predefined time, the WTRU's 210 L1 may signal the WTRU's 210 L3 indicating that an RL failure has occurred.

Figure 9:
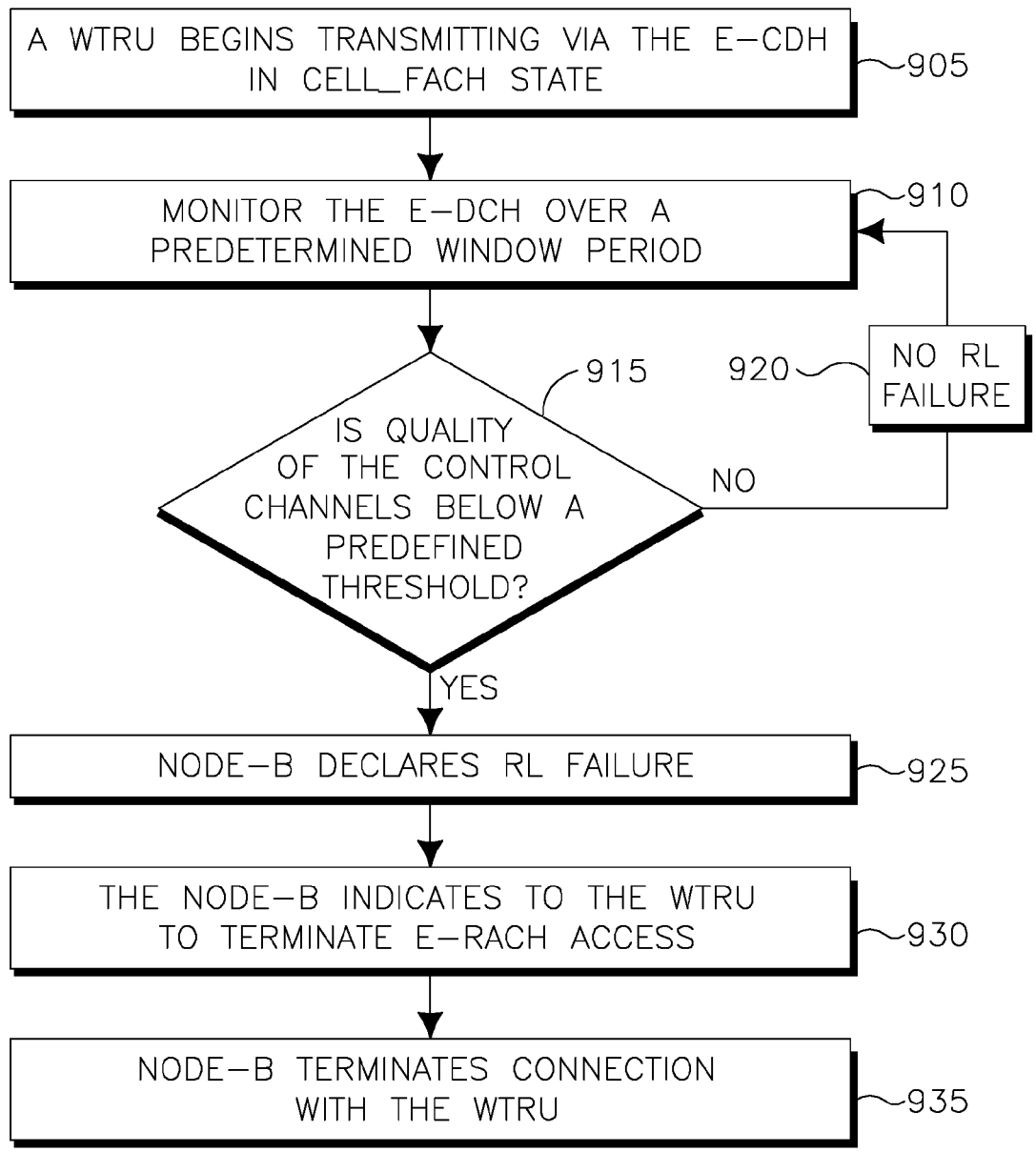
FIG. 9 shows a flow diagram of the Node-B triggering condition determining an occurrence of RL failure.

FIG. 9 shows a flow diagram of the Node-B 220 triggering condition determining an occurrence of the RL failure. A WTRU in the CELL_FACH state may begin transmission via the E-DCH 905. The Node-B 220 monitors the E-DCH over a predetermined window period 910. The Node-B 220 determines if the quality of associate control channels from the WTRU 210 is below a predetermined threshold 915. If the quality of the channel is not below the threshold, then there is no RL failure 920 and the monitoring of the quality of the channel continues 910. If the quality is below a predefined threshold, then Node-B 220 declares RL failure 925. The Node-B 220 may indicate to the WTRU 210 to terminate E-RACH access using a special value of E-AGCH 930. This occurs on a WTRU by WTRU basis. The indication may comprise signaling a zero grant value or using a reserved value. The Node-B 220 may terminate the connection with the WTRU 935.

Alternatively, the Node-B 220 may be configured to monitor the E-DCH for feedback from the WTRU 210 over a predetermined window period, P 910. If the quality of associate control channels (e.g., UL DPCCH, UL E-DPCCH, or UL HS-DPCCH) is below a predetermined threshold for a predefined time 915, the Node-B 220 declares an RL failure.

Alternatively, the Node-B 220 may monitor the transmission of an ACK or NACK feedback signals for the associated UL transmissions. When the Node-B 220 transmits K NACKs within a window of predetermined successive UL transmissions, L, the Node-B 220 may declare an RL failure.

Alternatively, the Node-B 220 may monitor success of HARQ processes. The Node-B 220 is configured to monitor the HARQ processes, and if R HARQ processes fail within a window of a predefined number of new HARQ process attempts, J, the Node-B 220 may declare an RL failure.

Alternatively, the Node-B 220 may be configured to transmit S successive TPC up commands over the F-DPCH or the DPCCH (i.e., indication from Node-B 220 to increase its power) to the WTRU 210 using the E-DCH in the CELL_ACH state. If the Node-B 220 transmits the commands without observing an increase in received power from the WTRU 210 to which the commands are sent, the Node-B 220 may declare an RL failure.

Alternatively, the Node-B 220 may be configured to receive the S TPC up commands over the UL DPCCH, F-DPCH or DPCCH (i.e., indication from the WTRU 210 to increase its power), and if the Node-B 220 is unable to further increase its transmission power, the Node-B 220 may declare an RL failure.

Alternatively, the Node-B 220 is configured to indicate to the WTRU 210 to release the E-DCH resources via a high speed shared control channel (HS-SCCH) order. The Node-B 220 may transmit and the HS-SCCH order may be a command transmitted via the HS-SCCH control channel.

Alternatively, new or existing L3 RRC messages may be used to indicate to the WTRU 210 that it may stop transmission via the E-DCH in the CELL_FACH state. Alternatively, the Node-B 220 may be configured to not respond to any UL transmission over a timeout period. Alternatively, the Node-B 220 may be configured to transmit K successive NACKs over the E-DCH HARQ indicator channel (E-HICH) to the WTRU 210.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit receive unit (WTRU) for detecting a radio link (RL) failure, the method comprising:
   monitoring a quality of a downlink fractional dedicated physical channel (F-DPCH);
   determining that the quality of the downlink F-DPCH is below a predefined threshold over a predefined number of frames;
   declaring an occurrence of RL failure; and
   terminating a transmission via an enhanced dedicated channel (E-DCH) in a cell forward access channel (CELL_FACH) state.

2. The method as in claim 1, wherein the termination of the E-DCH in the CELL_FACH state further comprises:
  releasing E-DCH resources;
  stopping E-DCH reception and transmission procedures; and
  resetting a medium access control (MAC) entity.

3. The method as in claim 2, wherein the physical layer indicates to the MAC layer that the RL failure has occurred and the MAC layer stops sending data to the physical layer.

4. The method as in claim 1, further comprising after terminating the E-DCH transmission in the CELL_FACH state:
  waiting a predefined amount of time;
  starting a backoff timer; and
  waiting for the backoff timer to expire prior to initiating another RACH access.

5. The method as in claim 4, further comprising the WTRU performing a cell reselection even if the timer has not expired.

6. The method as in claim 4, further comprising the WTRU terminating the back off timer and perform a cell reselection procedure when a cell reselection criterion is met.

7. A wireless transmit receive unit (WTRU), the WTRU comprising:
  a processor configured to monitor a quality of a downlink fractional dedicated physical channel (F-DPCH), determine that the quality of the downlink F-DPCH is below a predefined threshold, over a predefined number of frames, declare an occurrence of an RL failure, and terminate a transmission via an enhanced dedicated channel (E-DCH) in a cell forward access channel (CELL_FACH) state.

8. The WTRU as in claim 7, wherein the termination of the E-DCH in the CELL_FACH state further comprises:
  release E-DCH resources;
  stopping E-DCH reception and transmission procedures; and
  reset a medium access control (MAC) entity.

9. The WTRU as in claim 8, wherein a physical layer indicates to the MAC layer that the RL failure has occurred and the MAC layer stops sending data to the physical layer.

10. The WTRU as in claim 7, further comprising after terminating the E-DCH transmission in the CELL_FACH state:
  waiting a predefined amount of time;
  starting a backoff timer; and
  waiting for the backoff timer to expire prior to initiating another RACH access.

11. The WTRU as in claim 10, further comprising the WTRU performing a cell reselection even if the timer has not expired.

12. The WTRU as in claim 10, further comprising the WTRU terminating the backoff timer and perform a cell reselection procedure when the cell reselection criterion is met.

13. The WTRU as in claim 7, further comprising:
  the WTRU configured to monitor a quality of a downlink dedicated physical control channel (DPCCH).

14. The WTRU as in claim 7, further comprising:
  the WTRU configured to reselect a new cell and to release E-DCH resources if a post verification procedure fails and if a cell reselection criterion is met.

15. The WTRU as in claim 14, wherein if the cell reselection criterion is not met then, the WTRU does not attempt to complete a transmission and is further configured to release the E-DCH resources; and the WTRU is configured to wait for a predefined timer to expire before applying a backoff procedure and attempting an uplink random access.

16. A wireless transmit receive unit (WTRU), the WTRU comprising:
  a processor configured to monitor a quality of a downlink fractional dedicated physical channel (F-DPCH), determine that the quality of the downlink F-DPCH is below a predefined threshold over a predefined number of frames, detect a post verification failure, and terminate a transmission via an enhanced dedicated channel (E-DCH) in a cell forward access channel (CELL_ACH) state.

17. The WTRU as in claim 16, wherein if the post verification fails,
  start a backoff timer and
  the WTRU is configured to attempt an uplink random access once the timer has expired.

18. The WTRU as in claim 16, wherein if a cell reselection criteria is met, then the WTRU performs cell reselection; and
  the WTRU is configured to transmit even though the backoff timer may not have expired.

19. The WTRU as in claim 16, wherein if the post verification fails, then E-DCH resources are released.

* * * * *